United States Patent
Yu et al.

(10) Patent No.: US 9,893,846 B2
(45) Date of Patent: Feb. 13, 2018

(54) METHOD AND APPARATUS FOR HYBRID AUTOMATIC RETRANSMIT REQUEST (HARQ) FEEDBACK IN WIRELESS COMMUNICATION SYSTEM

(71) Applicant: Samsung Electronics Co., Ltd., Gyeonggi-do (KR)

(72) Inventors: Hyun-Kyu Yu, Gyeonggi-do (KR); Hyun-Seok Ryu, Gyeonggi-do (KR); Jeong-Ho Park, Seoul (KR); Cheol Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 79 days.

(21) Appl. No.: 14/712,400

(22) Filed: May 14, 2015

(65) Prior Publication Data
US 2015/0333878 A1 Nov. 19, 2015

(30) Foreign Application Priority Data
May 14, 2014 (KR) ........................ 10-2014-0057749

(51) Int. Cl.
*H04W 74/04* (2009.01)
*H04L 1/18* (2006.01)
(Continued)

(52) U.S. Cl.
CPC ......... *H04L 1/1893* (2013.01); *H04B 7/0623* (2013.01); *H04B 7/0695* (2013.01);
(Continued)

(58) Field of Classification Search
CPC .......................... H04W 74/006; H04L 1/1893
See application file for complete search history.

(56) References Cited

U.S. PATENT DOCUMENTS

2008/0212541 A1* 9/2008 Vayanos ............... H04L 1/1845
370/335
2013/0215844 A1* 8/2013 Seol .................... H04W 72/046
370/329
(Continued)

FOREIGN PATENT DOCUMENTS

EP           1 557 967         1/2004
KR     10-2007-0006748         1/2007

OTHER PUBLICATIONS

Intel Corporation, "Considerations on ePHICH Design", R1-122654, 3GPP TSG RAN WG1 Meeting #69, May 21-25, 2012, 4 pages.
(Continued)

*Primary Examiner* — Rhonda Murphy
(74) *Attorney, Agent, or Firm* — The Farrell Law Firm, P.C.

(57) ABSTRACT

The present disclosure relates to a pre-5th-Generation (5G) or 5G communication system to be provided for supporting higher data rates Beyond 4th-Generation (4G) communication system such as Long Term Evolution (LTE). A base station and method thereof are provided for hybrid automatic retransmit request (HARQ) feedback in a wireless communication system. A method includes generating transmission beam information for transmitting hybrid automatic retransmit request (HARQ) feedback information for an uplink data packet received from a terminal; scheduling a HARQ feedback channel in a downlink subframe, based on the transmission beam information; and transmitting the HARQ feedback information, based on the HARQ feedback channel.

18 Claims, 8 Drawing Sheets

(51) Int. Cl.
*H04W 74/00* (2009.01)
*H04B 7/06* (2006.01)
(52) U.S. Cl.
CPC .......... *H04L 1/1854* (2013.01); *H04L 1/1861* (2013.01); *H04W 74/006* (2013.01)

(56) References Cited

U.S. PATENT DOCUMENTS

2013/0301597 A1 11/2013 Kim et al.
2014/0369242 A1* 12/2014 Ng .................... H04W 72/0453
370/280

OTHER PUBLICATIONS

Texas Instruments, "PHICH Design for UL SU-MIMO", R1-102109, 3GPP TSG RAN WG1 #60bis, Apr. 12-16, 2010, 3 pages.
Hujun Yin et al., HARQ Timing and Protocol Considerations for IEEE 802.16m, May 7, 2008, 29 pages.
European Search Report dated Oct. 8, 2015 issued in counterpart application No. 15167628.5-1851, 11 pages.

* cited by examiner

METHOD AND APPARATUS FOR HYBRID AUTOMATIC RETRANSMIT REQUEST (HARQ) FEEDBACK IN WIRELESS COMMUNICATION SYSTEM

PRIORITY

The present application claims priority under 35 U.S.C. §119(a) to Korean Patent Application Serial No. 10-2014-0057749, which was filed in the Korean Intellectual Property Office on May 14, 2014, the entire disclosure of which is incorporated herein by reference.

BACKGROUND OF THE INVENTION

1. Field of the Invention

The present invention relates generally to Hybrid Automatic Retransmit Request (HARQ) feedback in a wireless communication system.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed. Recently, to mitigate high propagation path loss due to high frequency characteristics in a wireless communication system using high frequencies, beamforming is drawing attention. For example, the Institute of Electrical and Electronics Engineers (IEEE) 802.11ad group is discussing service support in a small area of a 10 to 20 meter radius using the beamforming in a high frequency band of 60 GHz. According to IEEE 802.11ad, an evolved-Node B (eNB) and a User Equipment (UE) determine an optimal transmission beam and an optimal reception beam for their communication and conduct the communication using the determined transmission and reception beams using a Sector Level Sweep (SLS) or a Beam Refinement Protocol (BRP).

A frame structure for the communication between the eNB and the UE in a conventional wireless communication system carries a control signal and a data signal, based on isotropic or omnidirectional transmission and reception. However, because a conventional frame structure is not adequate for a system supporting the beamforming, a new frame structure is required for a system supporting the beamforming is required.

SUMMARY OF THE INVENTION

Accordingly, the present invention is designed to address at least the problems and/or disadvantages described above and to provide at least the advantages described below.

An aspect of the present invention is to provide a control channel configuring method and apparatus for reducing the number of control signals used in a wireless communication system supporting beamforming.

Another aspect of the present invention is to provide a method and an apparatus for configuring a control channel carrying Hybrid Automatic Retransmit Request (HARQ) feedback information in a wireless communication system supporting beamforming.

Another aspect of the present invention is to provide a method and an apparatus for configuring and transmitting a HARQ feedback channel based on a number of available transmission beams for simultaneous transmission at an eNB of a wireless communication system supporting beamforming.

Another aspect of the present invention is to provide a method and an apparatus for configuring and transmitting a HARQ feedback channel based on a transmission beam index at an eNB of a wireless communication system supporting beamforming.

Another aspect of the present invention is to provide a method and an apparatus for configuring and transmitting a HARQ feedback channel based on a transmission delay time of HARQ feedback information with respect to an uplink data packet at an eNB of a wireless communication system supporting beamforming.

Another aspect of the present invention is to provide a method and an apparatus for configuring and transmitting a HARQ feedback channel based a reserved resource size of a control signal resource in a subframe at an eNB of a wireless communication system supporting beamforming.

Another aspect of the present invention is to provide a method and an apparatus for configuring and transmitting a HARQ feedback channel based on a transmission beam index of another downlink control channel allocated in a subframe at an eNB of a wireless communication system supporting beamforming.

Another aspect of the present invention is to provide a method and an apparatus for transmitting HARQ feedback channel configuration information at an eNB of a wireless communication system supporting beamforming.

In accordance with an aspect of the present invention, a method is provided for operating a base station in a wireless communication system, which includes generating transmission beam information for transmitting hybrid automatic retransmit request (HARQ) feedback information for an uplink data packet received from a terminal; scheduling a HARQ feedback channel in a downlink subframe, based on the transmission beam information; and transmitting the HARQ feedback information, based on the HARQ feedback channel.

In accordance with another aspect of the present invention, a method is provided for operating a terminal in a wireless communication system, which includes transmitting an uplink data packet to a base station; obtaining transmission beam information of the base station for a hybrid automatic retransmit request (HARQ) feedback channel for each of a plurality of downlink subframes;

determining a downlink subframe for receiving HARQ feedback information, based on the transmission beam information; and receiving a HARQ feedback channel including the HARQ feedback information in the determined downlink subframe.

In accordance with another aspect of the present invention, a base station is provided for use in a wireless communication system. The base station includes a controller configured to generate transmission beam information for transmitting hybrid automatic retransmit request (HARQ) feedback information for an uplink data packet received from a terminal, and scheduling a HARQ feedback channel in a downlink subframe, based on the transmission beam information; and a transceiver configured to transmit the HARQ feedback information, based on the HARQ feedback channel.

In accordance with another aspect of the present invention, a terminal is provided for use in a wireless communication system. The terminal includes a transceiver configured to transmit an uplink data packet to a base station; and a controller configured to obtain transmission beam information of the base station for a hybrid automatic retransmit request (HARQ) feedback channel for each of a plurality of downlink subframes, determine a downlink subframe for receiving HARQ feedback information, based on the transmission beam information, and obtain the HARQ feedback information by controlling the transceiver to receive a HARQ feedback channel in the determined downlink subframe.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, like reference numerals will be understood to refer to like parts, components and structures.

DETAILED DESCRIPTION OF EMBODIMENTS OF THE INVENTION

Figure 1A:
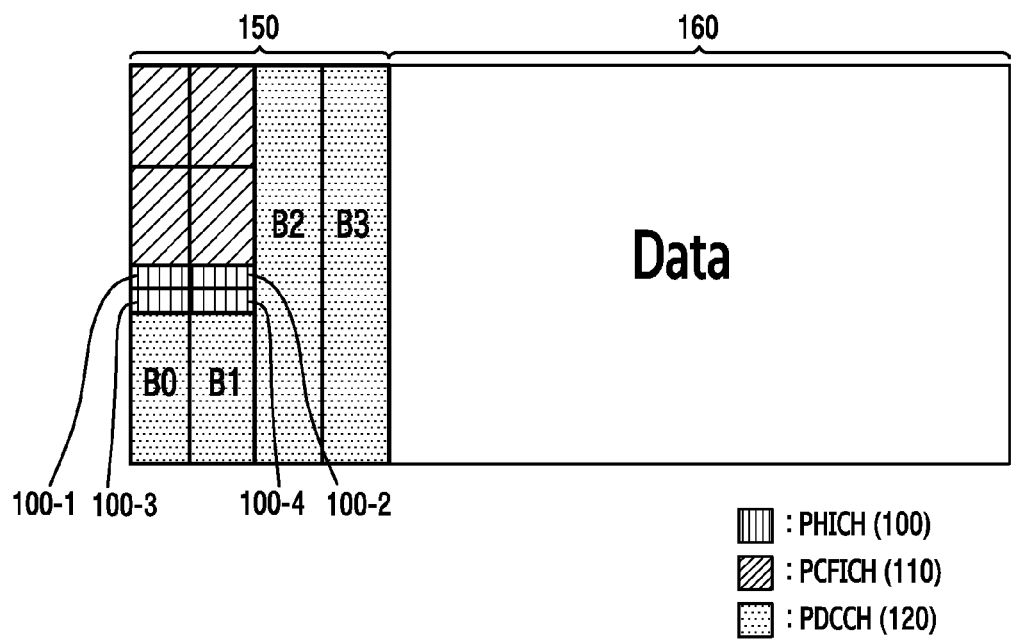
FIG. 1A illustrates a downlink control channel structure, according to an embodiment of the present invention.

The following description with reference to the accompanying drawings is provided to assist in a comprehensive understanding of various embodiments of the invention as will be defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to provide a clear and consistent understanding of the invention. Accordingly, it should be apparent to those skilled in the art that the following description of the embodiments of the present invention is provided for illustration purpose only and not for the purpose of limiting the invention, as defined by the appended claims and their equivalents.

Herein, the singular forms "a," "an," and "the" include plural referents unless the context clearly dictates otherwise. Thus, for example, reference to "a component surface" includes reference to one or more of such surfaces.

Further, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A wireless communication system according to an embodiment of the present invention includes a plurality of eNBs, where each of the eNBs provides a communication service to a specific geographical area (generally, referred to as "a cell"). The cell may be again divided into a plurality of areas (or sectors).

Further, a UE may be fixed or have mobility, and may also be referred to using other terms, such as a mobile station (MS), a mobile terminal (MT), a user terminal (UT), a subscriber station (SS), a terminal, a wireless device, a personal digital assistant (PDA), a wireless modem, a handheld device, etc.

The eNB refers to a station communicating with the UE, and may also be referred to using other terms, such as a base station (BS), a base transceiver system (BTS), an access point (AP), etc.

Various embodiments of the present invention provide techniques for transmitting and receiving a HARQ feedback channel in a wireless communication system supporting beamforming.

In the description of the embodiments of the present invention below, it is assumed that an eNB transmits, to a UE, Acknowledgement (ACK)/Negative ACK (NACK) information indicating whether an uplink data packet is successfully decoded, using one of two methods; 1) a HARQ method based on ACK/NACK or 2) a HARQ method based on NACK. According to the ACK/NACK-based HARQ method, the eNB explicitly transmits ACK/NACK information of an uplink data packet over a HARQ feedback channel. According to the NACK-based HARQ method, the eNB implicitly transmits NACK information by transmitting a retransmit command to a UE, when the decoding of the uplink data packet fails. It is noted that although embodiments of the present invention are described using the above-identified assumption, the present invention is equally applicable to other HARQ methods for transmitting the decoding success or failure of the uplink data packet to the UE.

Figure 1B:
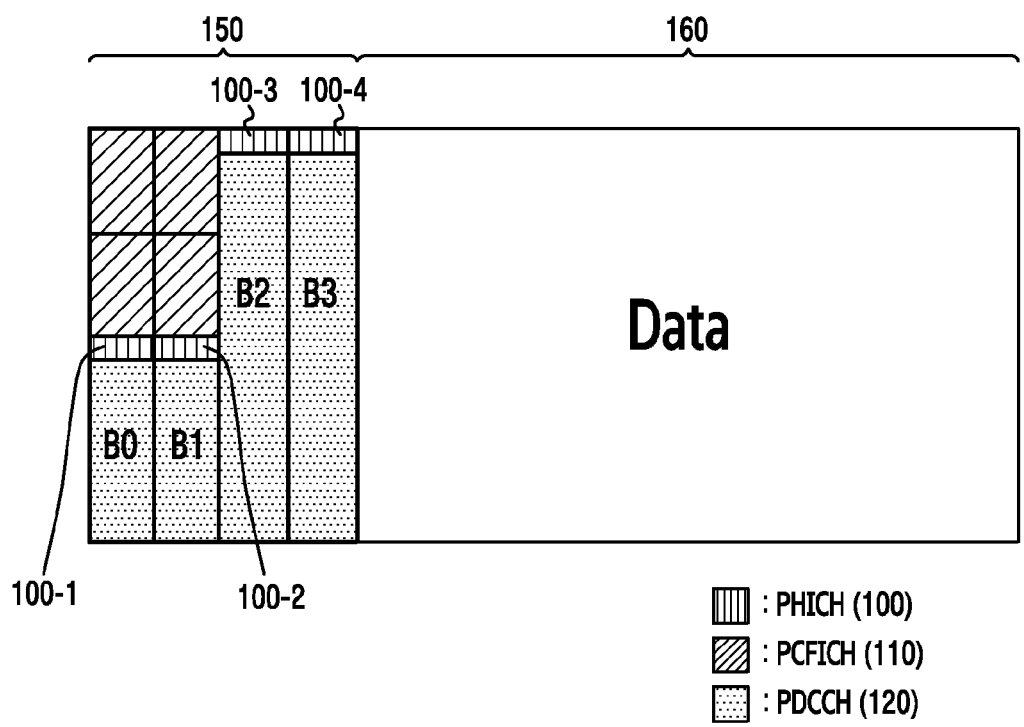
FIG. 1B illustrates a downlink control channel structure, according to an embodiment of the present invention.

FIGS. 1A and 1B illustrate downlink control channel structures according to embodiments of the present invention. For easy description, in FIGS. 1A and 1B, it is assumed that an eNB supports N-ary transmission beams B0 through BN−1. Specifically, it is assumed that the number of transmission beams supported by the eNB is greater than or equal to four, and it is assumed that the number of transmission beams available at the same timing is limited to two. For example, when analog beamforming or digital beamforming is used, the number of Radio Frequency (RF) chains or the number of digital paths limits the number of beams delivered in a single symbol (or time unit). Accordingly, it is assumed that one symbol may carry two beams.

Referring to FIGS. 1A and 1B, a downlink subframe includes a downlink control channel transmission region 150 and a downlink data channel transmission region 160. The downlink control channel transmission region 150 and the downlink data channel transmission region 160 may be divided based on time. A downlink control channel and a data channel each may be transmitted using beamforming.

As illustrated in FIGS. 1A and 1B, the downlink control channel region 150 includes a Physical Control Format Indicator Channel (PCFICH) 110, a Physical Downlink Control Channel (PDCCH) 120, and a Physical HARQ Indicator Channel (PHICH) 100. The PCFICH 110 delivers downlink control channel size information, and the PDCCH 120 delivers data resource allocation information. The PHICH 100 delivers ACK/NACK information of an uplink data packet, and is commonly referred to as "a HARQ feedback channel". Hereafter, the terms PHICH and HARQ feedback channel may be used interchangeably to represent the same channel.

In both FIGS. 1A and 1B, the PCFICH 110 is placed at the beginning of the control channel region 150 in a subframe, and contains PHICH information carried in the control channel region. That is, a PCFICH signal may include transmission beam index information of a PHICH signal transmitted in the corresponding subframe. For example, the PCFICH may be transmitted using the same transmission beam as the transmission beam of the PHICH signal in the same subframe.

For example, as illustrated in FIGS. 1A and 1B, if PHICH signals 100-1, 100-2, 100-3, and 100-4 are transmitted in the particular subframe using the transmission beams B0, B1, B2 and B3 of an eNB, respectively, PCFICH signals may be transmitted using the transmission beams B0, B1, B2 and B3 before the PHICH signal transmission in the particular subframe. Thereby, the eNB may inform that the PHICH signals are transmitted using the transmission beams carrying the PCFICH signals. As a result, the UE may then determine whether to receive the PHICH in the corresponding subframe in order to detect HARQ feedback information.

The PHICH 100 may also be placed ahead of the beginning of a resource of the PDCCH 120 in the subframe and may be transmitted using the same transmission beam as the transmission beam of the PDCCH 120 following the resource of the PHICH 100. For example, as illustrated in FIG. 1B, the PHICH signal 100-1 is positioned at the head of the PDCCH 120 transmitted using the transmission beam B0 and may be transmitted using the transmission beam B0, the PHICH signal 100-2 is positioned at the head of the PDCCH 120 transmitted using the transmission beam B1 and may be transmitted using the transmission beam B1, the PHICH signal 100-3 is positioned at the head of the PDCCH 120 transmitted using the transmission beam B2 and may be transmitted using the transmission beam B2, and the PHICH signal 100-4 is positioned at the head of the PDCCH 120 transmitted using the transmission beam B3 and may be transmitted using the transmission beam B3.

According to another embodiment, the PHICH 100 may be transmitted, regardless of the PDCCH 120 carried in the same frame. For example, although there is no PDCCH to deliver with the transmission beam B2 in the same subframe, the PHICH 100 may be transmitted using the transmission beam B2.

As illustrated in FIGS. 1A and 1B, the resource location of the PHICH 100 may dynamically change within the control channel region of the subframe.

The PHICH 100 may be dynamically configured, based on at least one of a number of available transmission beams for the simultaneous transmission, a transmission delay time of HARQ feedback information for the uplink data packet, a reserved resource size in the control signal resource of the subframe, a transmission beam index of another downlink control channel allocated in the subframe, and a preset maximum delay time and/or a preset minimum delay time. For example, the PHICH region in one subframe may deliver HARQ feedback information using m-ary different transmission beams. In so doing, the m number of the transmission beams may dynamically change, based on at least one of the number of the available transmission beams for the simultaneous transmission, the transmission delay time of the HARQ feedback information for the uplink data packet, the reserved resource size in the control signal resource of the subframe, the transmission beam index of another downlink control channel allocated in the subframe, and the a preset maximum delay time and/or a preset minimum delay time.

Figure 2:
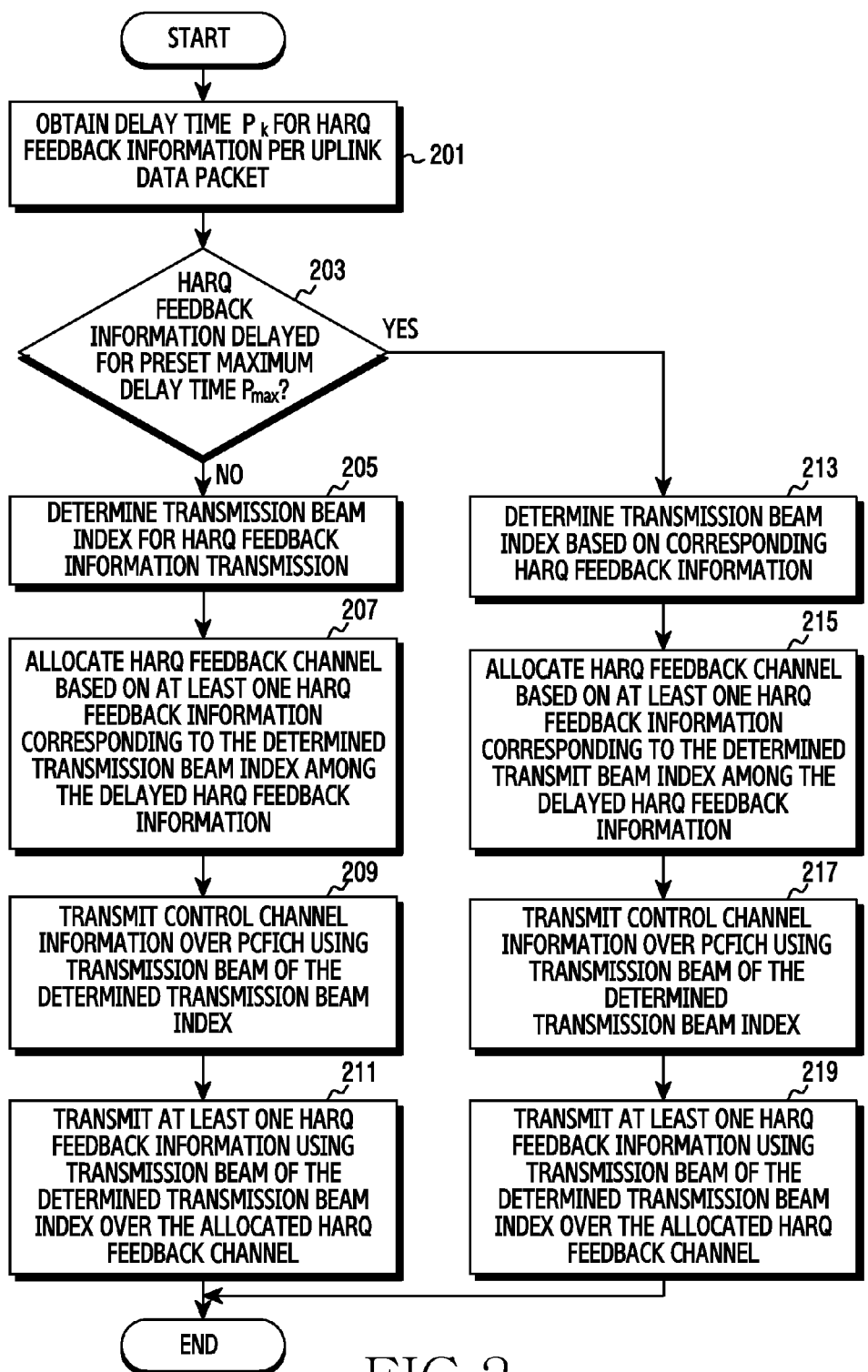
FIG. 2 is a flowchart illustrating operations for transmitting and receiving HARQ feedback information by an eNB, according to an embodiment of the present invention.

FIG. 2 is a flowchart illustrating operations for transmitting and receiving HARQ feedback information by an eNB, according to an embodiment of the present invention. In FIG. 2, it is assumed that HARQ feedback information to be carried by an i-th subframe is scheduled and the HARQ feedback information is transmitted based on the scheduling.

Referring to FIG. 2, in step 201, the eNB obtains a delay time $P_k$ for HARQ feedback information per uplink data packet. That is, the eNB obtains the delayed time of the HARQ feedback information, without being transmitted to a UE, for each uplink data packet received before an i-th subframe. The delay time of the HARQ feedback information may be represented using the subframe. For example, the delay time of the HARQ feedback information for the uplink data packet received in an (i-P)-th subframe may be represented as P-ary subframes.

In step 203, the eNB determines whether HARQ feedback information has been delayed for a preset maximum delay time $P_{max}$. For example, the eNB determines whether HARQ feedback information of the uplink data packets received before the i-th subframe include the HARQ feedback information that has been delayed for the maximum delay time $P_{max}$. Herein, the maximum delay time $P_{max}$ may indicate a maximum time for delaying the HARQ feedback information transmission of the corresponding uplink data packet, based on the uplink data packet reception from the UE. For example, when the maximum delay time is six subframes, the eNB will transmit HARQ feedback information for a particular uplink data packet within the six subframes, based on particular uplink data packet reception from the UE.

When detecting no HARQ feedback information has been delayed for the preset maximum delay time $P_{max}$, the eNB determines a transmission beam index for the HARQ feedback information transmission in step 205. The eNB may determine at least one transmission beam index for the HARQ feedback information transmission in the corresponding subframe, based on at least one of the number of the transmission beams available for the simultaneous transmission, the delay time of the HARQ feedback information of the uplink data packet, the transmission beam index of the HARQ feedback information, the reserved resource size in the control signal resource in the subframe, the transmission beam index of another downlink control channel allocated in the subframe, and the preset maximum delay time and minimum delay time $P_{min}$. Herein, the minimum delay time $P_{min}$ may indicate the earliest time for transmitting the HARQ feedback information of the corresponding uplink data packet, based on the uplink data packet reception from the UE.

For example, when the minimum delay time is two subframes, the eNB may transmit HARQ feedback information of a particular uplink data packet after the two subframes, based on the particular uplink data packet reception from the UE. The reserved resource size may indicate the remaining resource size, excluding resources used for the PDCCH, among the control channel resources in the corresponding subframe. The transmission beam index of the another downlink control channel allocated in the subframe may indicate a transmission beam index of the PDCCH in the corresponding subframe.

In step 207, the eNB allocates a HARQ feedback channel, based on at least one HARQ feedback information corresponding to at least one transmission beam index determined among the delayed HARQ feedback information. For example, the eNB searches the delayed HARQ feedback information for the HARQ feedback information which is not delayed for the maximum delay time, but is delayed for more than the minimum delay time $P_{min}$, and uses the transmission beam determined in step 205 with respect to the corresponding UE, and then allocates a resource for the HARQ feedback information transmission corresponding to the transmission beam index, based on the searched HARQ feedback information. That is, when determining the transmission beam k, the eNB may search the HARQ feedback information delayed for more than the minimum delay time, for the HARQ feedback information to be delivered by the transmission beam k, and then allocate the HARQ feedback channel for the transmission beam k, based on the amount of HARQ feedback information found through the search.

In step 209, the eNB transmits control channel information over the PCFICH using the transmission beam corresponding to the determined transmission beam index. For example, to transmit the HARQ feedback information using the transmission beam of the indexes B0 and B2 in the corresponding subframe, the eNB may transmit downlink control channel size information using B0 and B2 over the PCFICH, before the HARQ feedback information transmission, over the PHICH. This downlink control channel size information transmission informs the UE of the transmission beams carrying the PHICH in the corresponding subframe, in order for each 300 to determine whether or not to receive the PHICH in the corresponding subframe, in order to detect the HARQ feedback information.

In step 211, the eNB transmits at least one HARQ feedback information, based on the transmission beam index determined in step 205, over the allocated HARQ feedback channel. For example, to transmit the HARQ feedback information using the transmission beam of the indexes B0 and B2 in the corresponding subframe, the eNB may transmit the HARQ feedback information using the transmission beams B0 and B2 through the HARQ feedback channel allocated for each index.

However, when the eNB detect HARQ feedback information delayed for the preset maximum delay time $P_{max}$ in step 203, the eNB then determines a transmission beam index, based on the corresponding HARQ feedback information in step 213. The eNB may identify the UE corresponding to the HARQ feedback information, and determine a transmission beam index used to communicate with the identified UE, as the transmission beam index for transmitting the HARQ feedback information in the corresponding subframe. Herein, when there are multiple HARQ feedback information delayed for the same time as the maximum delay time $P_{max}$ and the multiple HARQ feedback information correspond to different UEs, respectively, the eNB may determine a plurality of transmission beam indexes used to communicate with the multiple UEs as the transmission beam indexes for transmitting the HARQ feedback information in the corresponding subframe.

In step 215, the eNB allocates a HARQ feedback channel, based on at least one HARQ feedback information corresponding to at least one transmission beam index determined among the delayed HARQ feedback information. For example, the eNB searches the delayed HARQ feedback information for HARQ feedback information that has not been delayed for the maximum delay time, but has been delayed for more than the minimum delay time $P_{min}$, uses the transmission beam determined in step 213, and then allocates a HARQ feedback information transmission resource for the corresponding transmission beam index so that all of the HARQ feedback information identified through the search may be transmitted in the corresponding subframe. Accordingly, the eNB may allocate the HARQ feedback information transmission resource for the corresponding transmission beam index by additionally considering the number of the available transmission beams for the simultaneous transmission, the reserved resource size in the control signal resource of the subframe, and the transmission beam index of another downlink control channel allocated in the subframe. Herein, when the reserved resource size in the control signal resource of the corresponding subframe is not sufficient for delivering all of the HARQ feedback information having the same transmission beam as the determined transmission beam, the eNB may transmit the HARQ feedback information of the longest delay time first. For example, according to the NACK-based HARQ method, when the HARQ feedback information delayed for the maximum delay time $P_{max}$ is the ACK, the eNB may not allocate the HARQ feedback channel (i.e., the PHICH) for the corresponding HARQ feedback information.

In step 217, the eNB transmits control channel information over the PCFICH using the transmission beam corresponding to the determined transmission beam index. For example, to transmit the HARQ feedback information using the transmission beam of the indexes B0 and B2 in the corresponding subframe, the eNB may transmit downlink control channel size information using B0 and B2 over the PCFICH, before the HARQ feedback information transmission over the PHICH. This transmission of the downlink control channel size information informs the UE of the transmission beam carrying the PHICH in the corresponding subframe, in order for each UE to determine whether to receive the PHICH in the corresponding subframe to detect the HARQ feedback information.

In step 219, the eNB transmits at least one HARQ feedback information, based on the transmission beam index determined in step 213, over the allocated HARQ feedback channel. For example, to transmit the HARQ feedback information using the transmission beam of the indexes B0 and B2 in the corresponding subframe, the eNB may transmit the HARQ feedback information using the transmission beams B0 and B2 through the allocated HARQ feedback channel for each index.

Figure 3:
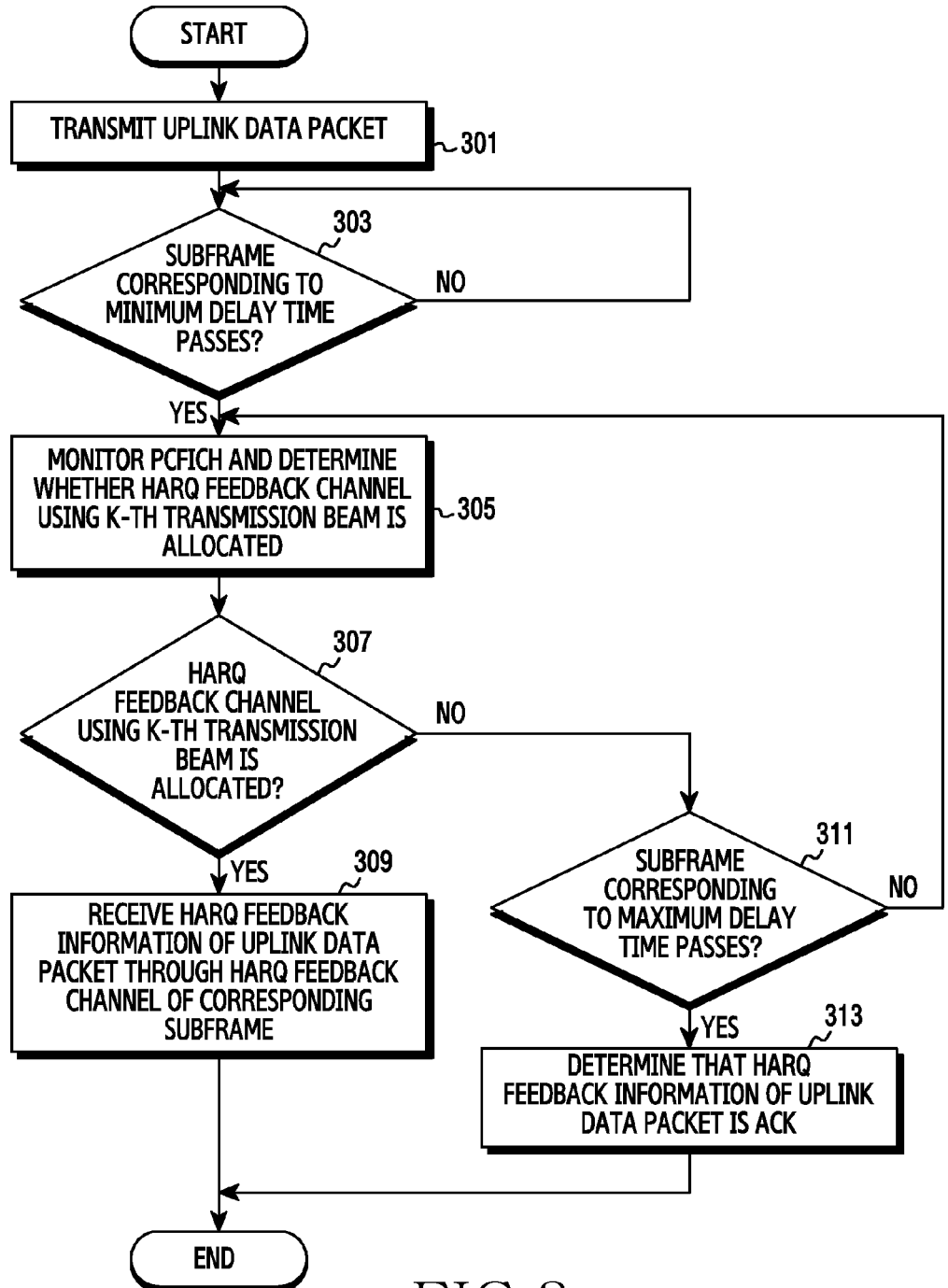
FIG. 3 is a flowchart illustrating operations for receiving HARQ feedback information by a UE, according to an embodiment of the present invention.

FIG. 3 is a flowchart illustrating operations for receiving HARQ feedback information by a UE, according to an embodiment of the present invention. In FIG. 3, it is assumed that HARQ feedback information for an uplink data packet delivered in a j-th subframe is received, and that an eNB uses a k-th transmission beam (or a transmission beam k) for the communication with the UE. Referring to FIG. 3, in step 301, the UE transmits the uplink data packet. For example, the UE transmits the uplink data packet to the eNB in the j-th subframe.

In step 303, the UE determines whether the subframe corresponding to the minimum delay time passes. The minimum delay time $P_{min}$ may indicate the earliest time for receiving the HARQ feedback information of the corresponding uplink data packet, based on the uplink data packet transmission of the UE. For example, when the minimum delay time is three subframes, the UE may receive the HARQ feedback information of the corresponding uplink data packet, after the three subframes, based on the subframe carrying the uplink data packet. Herein, the minimum delay time may be received in advance from the eNB or be agreed in advance with the eNB.

When the subframe corresponding to the minimum delay time passes in step 303, the UE monitors the PCFICH and determines whether the HARQ feedback channel using the k-th transmission beam is allocated in step 305. For example, the UE transmits the uplink data packet in the j-th subframe, monitors a $(j+P_{min})$-th subframe, and then determines whether the PCFICH channel is received from the eNB using the k-th transmission beam.

In step 307, the UE determines whether the HARQ feedback channel using the k-th transmission beam is allocated, according to the PCFICH monitoring. When the PCFICH channel is received using the k-th transmission beam, the UE may determine the HARQ feedback channel allocation using the k-th transmission beam in the corresponding subframe. However, when no PCFICH channel is received using the k-th transmission beam, the UE may determine no HARQ feedback channel allocation using the k-th transmission beam in the corresponding subframe.

When the HARQ feedback channel using the k-th transmission beam is allocated in step 307, the UE receives the HARQ feedback information of the uplink data packet through the HARQ feedback channel of the corresponding subframe in step 309.

However, when the HARQ feedback channel using the k-th transmission beam is not allocated in step 307, the UE determines whether the subframe corresponding to the maximum delay time passes in step 311. Herein, the maximum delay time may indicate a maximum time for receiving the HARQ feedback information of the corresponding uplink data packet, based on the uplink data packet transmission of the UE. For example, when the maximum delay time is six subframes and the UE transmits a particular uplink data packet in the j-th subframe, the UE may receive HARQ feedback information of a particular uplink data packet within a (j+6)-th subframe.

When the subframe corresponding to the maximum delay time does not pass in step 311, the UE determines whether the HARQ feedback channel using the k-th transmission beam is allocated by monitoring the PCFICH of a next subframe in step 311.

However, when the subframe corresponding to the maximum delay time passes in step 311, the UE determines that the HARQ feedback information of the corresponding uplink data packet is an ACK in step 313. For example, the HARQ feedback information is transmitted only for the NACK according to the NACK-based HARQ method.

Accordingly, when the HARQ feedback channel (i.e., the PHICH) using the k-th transmission beam is not allocated between the subframe corresponding to the minimum delay time and the subframe corresponding to the maximum delay time based on a particular uplink data packet transmission, the UE may determine that the HARQ feedback information of the particular uplink data packet is the ACK.

Figure 4:
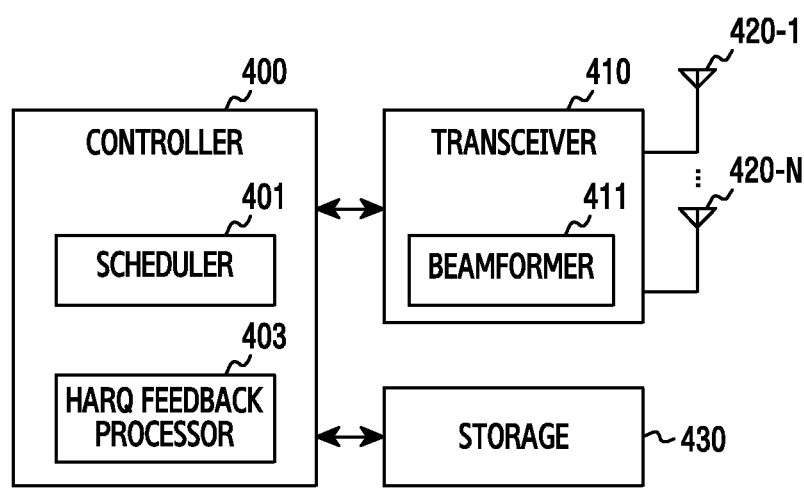
FIG. 4 illustrates an eNB, according to an embodiment of the present invention.

FIG. 4 illustrates an eNB according to an embodiment of the present invention. Referring to FIG. 4, the eNB includes a controller 400, a transceiver 410, a plurality of antennas 420-1 through 420-N, and a storage 430. While each of the components is illustrated separately in FIG. 4, according to the functions of the eNB, alternatively, they may be implemented using a single component or one or more other components.

The controller 400 controls and processes the operations of the eNB, which include providing a communication service to a UE. In particular, the controller 400 includes a scheduler 401 for controlling and processing the control channel configuration in the subframe, and includes a HARQ feedback processor 403 for controlling and processing to transmit the HARQ feedback information for the uplink data packet received from the UE.

Specifically, the scheduler 401 schedules to configure the control channel region of the downlink subframe and to transmit the control channel signal. For example, the scheduler 401 may configure the downlink control channel region including the PCFICH 110, the PDCCH 120, and the PHICH 100, as illustrated in FIGS. 1A and 1B.

More specifically, the scheduler 401 may perform the scheduling such that the PCFICH is positioned at the beginning of the control channel region in the subframe and contains the PHICH information carried in the control channel region. The scheduler 401 may perform the scheduling such that the PCFICH signal includes the transmission beam index information of the PHICH signal delivered in the corresponding subframe. The scheduler 401 may perform the scheduling such that the PHICH 100 is placed ahead of the start of the resource of the PDCCH 120 in the subframe. The scheduler 401 may perform the scheduling such that the PHICH 100 is transmitted using the same transmission beam as the transmission beam of the PDCCH 120, following the resource of the PHICH 100.

According to another embodiment, the scheduler 401 may schedule to transmit the PHICH 100, regardless of the PDCCH 120 carried in the same subframe.

The scheduler 401 may dynamically configure the PHICH 100, based on at least one of the number of the available transmission beams for the simultaneous transmission, the transmission delay time of the HARQ feedback information for the uplink data packet, the reserved resource size in the control signal resource of the subframe, the transmission beam index of another downlink control channel allocated in the subframe, and the preset maximum delay time and/or the present minimum delay time.

For example, the scheduler 401 may schedule to transmit the HARQ feedback information using m-ary different transmission beams in the PHICH region of one subframe. Accordingly, the scheduler 401 may dynamically change the m number of the transmission beams and the HARQ feedback information carried by the m-ary transmission beams, based on at least one of the number of the available transmission beams for the simultaneous transmission, the transmission delay time of the HARQ feedback information for the uplink data packet, the reserved resource size in the control signal resource of the subframe, the transmission beam index of another downlink control channel allocated in the subframe, and the preset maximum delay time and/or the preset minimum delay time. For example, the scheduler 401 may schedule the HARQ feedback information to transmit in an i-th subframe as illustrated in FIG. 2.

The HARQ feedback processor 403 may transmit the decoding success or failure of the uplink data packet to a corresponding UE, based on one of the ACK/NACK-based HARQ method and the NACK-based HARQ method. The HARQ feedback processor 403 generates the HARQ feedback information indicating whether the decoding is successful for each uplink data packet, and calculates the transmission delay time of the generated HARQ feedback information. The transmission delay time may be represented on the subframe basis and updated for each subframe. The HARQ feedback processor 403 may map and manage the HARQ feedback information and the transmission beam index for each uplink data packet. For example, using the k-th transmission beam for the communication with a particular UE, the HARQ feedback processor 403 transmits the HARQ feedback information of the uplink data packet received from the particular UE through the k-th transmission beam, and thus, manages the HARQ feedback information in association with the k-th transmission beam.

The transceiver 410 transmits and receives signals over the antennas 420-1 through 420-N, under control of the controller 400. The transceiver 410 includes a beamformer 411.

Although not illustrated in FIG. 4, the transceiver 410 may include a transmitter including a plurality of encoders, a plurality of modulators, a plurality of subcarrier mappers, and a plurality of RF transmitters. The transceiver 410 may also include a receiver including a plurality of decoders, a plurality of demodulator, a plurality of subcarrier demappers, and a plurality of RF receivers.

The beamformer 411 may form a beam for transmitting and receiving signals to and from the UE, based on beamforming information (e.g., the transmission beam index or a reception beam index) fed from the controller 400. Herein, the beamformer 411 may form a transmission beam and/or a reception beam, as requested by the controller 400, using at least one of digital beamforming, antennas corresponding to predefined beam directions, an antenna bundle, and an antenna array. Herein, the antennas 420-1 through 420-N may include a beam antenna and/or an array antenna for forming the beam in a particular direction.

The storage 430 stores various data and programs for the operations of the eNB. The storage 430 may store delayed HARQ feedback information and its related transmission beam information. The storage 430 may also store the transmission delay time information of the HARQ feedback information.

Figure 5:
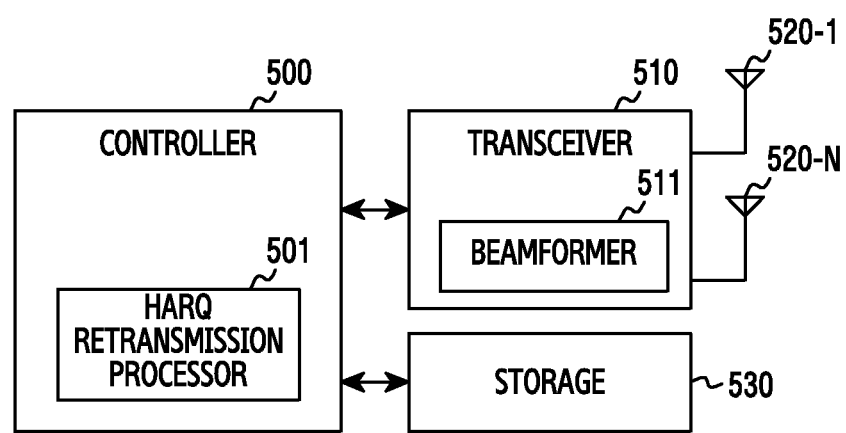
FIG. 5 illustrates a UE, according to an embodiment of the present invention.

FIG. 5 illustrates a UE according to an embodiment of the present invention.

Referring to FIG. 5, the UE includes a controller 500, a transceiver 510, a plurality of antennas 520-1 through 520-N, and a storage 530.

The controller 500 controls and processes the operations of the UE for receiving the communication service. In particular, the controller 500 includes a HARQ retransmission processor 501 for controlling and processing to receive the HARQ feedback information of the uplink data packet from an eNB and to retransmit the uplink data packet of the decoding error.

The HARQ retransmission processor 501 may receive the HARQ feedback information of the uplink data packet, based on one of the ACK/NACK-based HARQ method and the NACK-based HARQ method.

After transmitting the uplink data packet, the HARQ retransmission processor 501 monitors subframes from the subframe corresponding to the minimum delay time to the subframe corresponding to the maximum delay time, in order to determine whether the HARQ feedback channel for the UE is allocated. For example, the HARQ retransmission processor 501 monitors the PCFICH from the subframe after the minimum delay time to the subframe corresponding to the maximum delay time, based on the subframe carrying the uplink data packet, and determines whether the HARQ feedback channel transmitted in the k-th transmission beam is allocated. Herein, the k-th transmission beam indicates the transmission beam used by an eNB in the communication with the UE.

When detecting the PCFICH signal delivered by the k-th transmission beam, the HARQ retransmission processor 501 may determine the allocation of the HARQ feedback channel transmitted using the k-th transmission beam in the corresponding subframe. When detecting the PCFICH signal delivered by the k-th transmission beam, the HARQ retransmission processor 501 may process to receive the HARQ feedback information of the uplink data packet through the HARQ feedback channel in the corresponding subframe. However, when no PCFICH signal is delivered by the k-th transmission beam before the subframe corresponding to the maximum delay time passes, the HARQ retransmission processor 501 may determine that there is no allocation of the HARQ feedback channel transmitted using the k-th transmission beam in the corresponding subframe. Accordingly, the HARQ retransmission processor 501 may determine that the eNB successfully decoded the corresponding uplink data packet.

The transceiver 510 transmits and receives signals over the antennas 520-1 through 520-N, under control of the controller 500. The transceiver 510 includes a beamformer 511.

Although not illustrated in FIG. 5, the transceiver 510 may include a transmitter including a plurality of encoders, a plurality of modulators, a plurality of subcarrier mappers, and a plurality of RF transmitters. The transceiver 510 may also include a receiver including a plurality of decoders, a plurality of demodulator, a plurality of subcarrier demappers, and a plurality of RF receivers.

The beamformer 511 may form a beam for transmitting and receiving signals to and from the eNB based on beamforming information (e.g., the transmission beam index or the reception beam index) fed from the controller 500. Herein, the beamformer 511 may form a transmission beam and/or a reception beam as requested by the controller 500, using at least one of digital beamforming, antennas corresponding to predefined beam directions, an antenna bundle, and an antenna array. The antennas 520-1 through 520-N may include a beam antenna and/or an array antenna for forming the beam in a particular direction.

The storage 530 stores various data and programs for the operations of the UE. The storage 530 may store the transmission beam information of the eNB used for the communication between the eNB and the UE. The storage 530 may also store information about a number of subframes in which the HARQ feedback information of the corresponding uplink data is not received, or a number of subframes that pass, after the subframe carries the uplink data packet, based on the subframe carrying the uplink data packet.

In FIGS. 2 through 5, as described above, an eNB may dynamically allocate a HARQ feedback channel and a transmission beam in each subframe, and informs a UE of transmission beam information of the HARQ feedback channel allocated in a corresponding subframe through a PCFICH.

Alternatively, the eNB may semi-statically allocate the HARQ feedback channel and the transmission beam. For example, when the eNB supports ten transmission beams, the first subframe may use first and second transmission beams, the second subframe may use third and fourth transmission beams, the third subframe may use fifth and sixth transmission beams, the fourth subframe may use seventh and eighth transmission beams, the fifth subframe may use ninth and tenth transmission beams, and the sixth subframe may use the first and second transmission beams. Using such semi-static allocation, the transmission beam information allocated in the subframe may be carried by a broadcasting channel or other system information message to the UE. Accordingly, the UE may obtain, in advance, information indicating which transmission beam carries the HARQ feedback information in which subframe, based on the broadcasting channel or other system information message. The UE may also receive the HARQ feedback channel by monitoring a subframe used by the k-th transmission beam of the eNB, without having to continuously monitor the minimum delay subframe to the maximum delay subframe.

Figure 6:
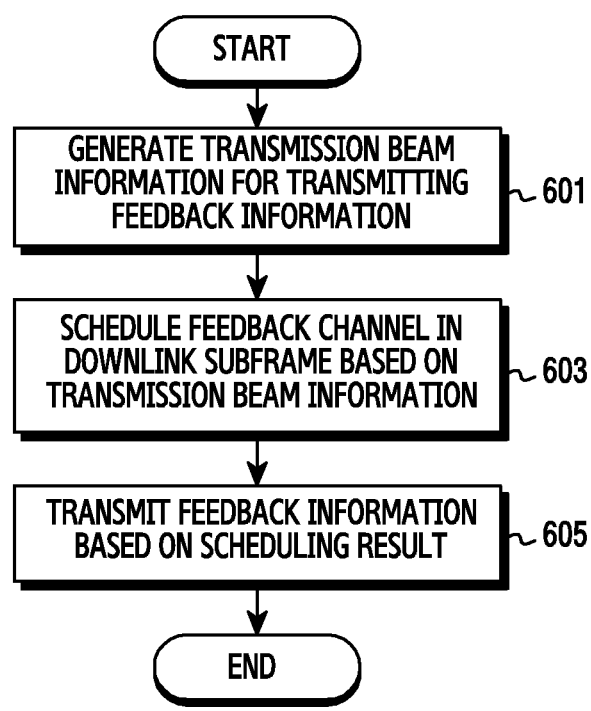
FIG. 6 is a flowchart illustrating operations of an eNB, according to an embodiment of the present invention.

FIG. 6 is a flowchart illustrating operations of an eNB, according to an embodiment of the present invention.

Referring to FIG. 6, in step 601, the eNB generates transmission beam information for transmitting the HARQ feedback information of the uplink data packet received from at least one UE.

In step 603, the eNB 200 schedules the HARQ feedback channel in the downlink subframe, based on the transmission beam information for the HARQ feedback information. The eNB may dynamically schedule the HARQ feedback channel in the downlink subframe by additionally considering at least one of the number of the available transmission beams for the simultaneous transmission, the reserved resource size in the control signal resource of the subframe, the transmission beam index of another downlink control channel allocated in the subframe, the transmission delay time of the HARQ feedback information, the preset maximum delay time, and the preset minimum delay time.

The eNB may also schedule to transmit the HARQ feedback channel in the downlink subframe using the same transmission beam as the transmission beam of other successive downlink control channel.

The eNB may determine whether the delayed HARQ feedback information includes first HARQ feedback information having the transmission delay time equal to the preset maximum delay time. When detecting the first HARQ feedback information having the transmission delay time equal to the preset maximum delay time, the eNB may identify its transmission beam corresponding to the first HARQ feedback information and then schedule to transmit the HARQ feedback information to be carried by the transmission beam among the delayed HARQ feedback information, through the HARQ feedback channel in the corresponding downlink subframe. Accordingly, the eNB may schedule to transmit only the NACK information, excluding the ACK information, in the first HARQ feedback information having the transmission delay time equal to the preset maximum delay time.

The eNB may transmit the transmission beam information of the HARQ feedback channel in the corresponding downlink subframe, to the UE. Herein, the transmission beam information of the HARQ feedback channel may be delivered by the control signal using the transmission beam for the HARQ feedback channel before the HARQ feedback information transmission in the corresponding downlink subframe.

In step 605, the eNB transmits the HARQ feedback information, based on the scheduling result.

Figure 7:
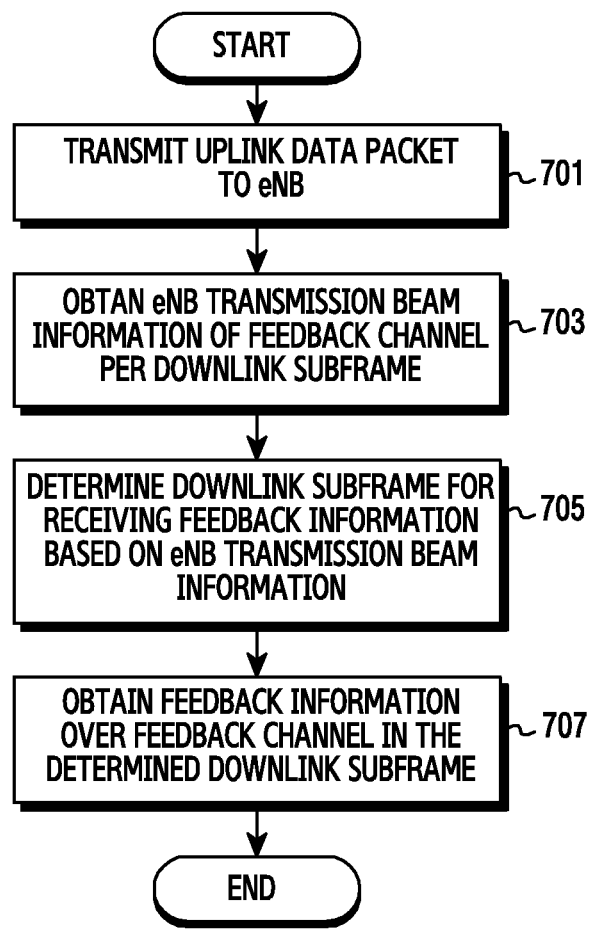
FIG. 7 is a flowchart illustrating operations of an UE, according to an embodiment of the present invention.

FIG. 7 is a flowchart illustrating operations of a UE, according to an embodiment of the present invention.

Referring to FIG. 7, in step 701, the UE transmits an uplink data packet to an eNB.

In step 703, the UE obtains the eNB transmission beam information of the HARQ feedback channel for each downlink subframe.

In step 705, the UE determines the downlink subframe for receiving the HARQ feedback information, based on the confirmed eNB transmission beam information. The downlink subframe may include the subframes, after the minimum delay time, within the maximum delay time, based on the subframe carrying the uplink data packet. The UE may receive a downlink control channel signal, before the HARQ feedback channel reception, for each downlink subframe, and determine an eNB transmission beam corresponding to the received downlink control channel signal as the transmission beam for the HARQ feedback channel.

When the transmission beam for the HARQ feedback channel is identical to the transmission beam used by the eNB for the communication between the UE and the eNB, the UE may determine the downlink subframe as the downlink subframe for receiving the HARQ feedback information.

In step 707, the UE obtains the HARQ feedback information by receiving the HARQ feedback channel in the determined downlink subframe.

As described above, in accordance with the embodiments of the present invention, an eNB in a wireless communication system supporting beamforming may dynamically configure a HARQ feedback channel, based on at least one of a number of available transmission beams for the simultaneous transmission, a transmission delay time of the HARQ feedback information for the uplink data packet, a transmission beam index of the HARQ feedback information, a reserved resource size in the control signal resource of the subframe, a transmission beam index of another downlink control channel allocated in the subframe, a preset maximum delay time, and a preset minimum delay time. Therefore, overhead in the HARQ feedback channel transmission may be reduced and the amount resource used for control channel transmission may also be reduced.

The present operations illustrated in FIGS. 2, 3, 6, and 7 may also be performed by a single controller, such as a computer, where program instructions for performing the operation, which are executable by various computers, can be recorded in a computer-readable recording medium. The computer-readable recording medium may include a program instruction, a data file, and a data structure alone or in combination. The program instruction can be specially designed for the present disclosure or well-known to those skilled in computer software. The computer-readable recording medium can include magnetic media such as a hard disk, a floppy disk and a magnetic tape, optical media such as a Compact Disc Read Only Memory (CD-ROM) and a Digital Versatile Disc (DVD), magneto-optical media such as a floptical disk, and hardware devices specifically configured to store and execute the program instruction such as a Read Only Memory (ROM), a Random Access Memory (RAM), and a flash memory. The program instruction may include a machine code made by a complier and also high-level language code, which is executable by a computer using an interpreter. When at least a portion of a base station or a relay station is realized as a computer program, the computer-readable recording medium storing the computer program falls within the present invention.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for operating a base station (BS) in a wireless communication system, the method comprising:
    identifying a downlink (DL) subframe based on a transmission delay time regarding hybrid automatic repeat request (HARQ) feedback information for an uplink (UL) data packet received from a terminal;
    identifying a transmission (Tx) beam index for transmitting the HARQ feedback information, based on determining that the identified DL subframe is equal to a subframe corresponding to a pre-determined maximum delay time;
    determining, based on the identified Tx beam index, HARQ feedback channel resources for transmitting the HARQ feedback information; and
    transmitting, to the terminal, the HARQ feedback information, based on the determined HARQ feedback channel resources and the identified Tx beam index.

2. The method of claim 1, further comprising, based on determining that the identified DL subframe is not equal to the subframe corresponding to the pre-determined maximum delay time, identifying the Tx beam index based on at least one of a number of available Tx beams for simultaneous transmission, a reserved resource size in a control channel resource of a subframe, a Tx beam index for at least one DL control channel resource allocated in the subframe, a Tx delay time of the HARQ feedback information, and a preset minimum delay time.

3. The method of claim 2, wherein transmitting the HARQ feedback information comprises transmitting only Negative Acknowledgement (NACK) information, excluding ACK information, in the HARQ feedback information.

4. The method of claim 1, further comprising transmitting, before the HARQ feedback information is transmitted in the DL subframe, a control signal including information for the identified Tx beam index based on the identified Tx beam index in the DL subframe.

5. The method of claim 1, wherein the HARQ feedback information is configured to be transmitted using a Tx beam of a successive DL control signal.

6. A method for operating a terminal in a wireless communication system, the method comprising:
    transmitting an uplink (UL) data packet to a base station (BS);
    determining that a downlink (DL) subframe corresponding to hybrid automatic repeat request (HARQ) feedback information for the UL data packet does not exceed a subframe corresponding to a pre-determined maximum delay time;
    identifying a transmission (Tx) beam index for receiving the HARQ feedback information;
    identifying HARQ feedback channel resources for receiving the HARQ feedback information based on the identified Tx beam index; and
    receiving, from the BS, the HARQ feedback information based on the identified HARQ feedback channel resources.

7. The method of claim 6, further comprising:
    determining that the DL subframe corresponding to the HARQ feedback information exceeds the subframe corresponding to the pre-determined maximum delay time; and
    determining that the UL data packet transmitted to the BS is successfully decoded by the BS.

8. The method of claim 7, further comprising:
    determining that the DL subframe corresponding to the HARQ feedback information exceeds a subframe corresponding to a pre-determined minimum delay time; and
    determining whether the DL subframe corresponding to the HARQ feedback information exceeds the subframe corresponding to the pre-determined maximum delay time.

9. The method of claim 6, wherein the Tx beam index is identified, by the BS, based on at least one of a number of available Tx beams for simultaneous transmission, a reserved resource size in a control channel resource of a subframe, a Tx beam index for at least one DL control channel resource allocated in the subframe, a Tx delay time of the HARQ feedback information, and a pre-determined minimum delay time.

10. A base station (BS) in a wireless communication system, the base station comprising:
    a transceiver; and
    a processor configured to:
        identify a downlink (DL) subframe based on a transmission delay time regarding hybrid automatic repeat request (HARQ) feedback information for an uplink (UL) data packet received via the transceiver from a terminal;
        identify a transmission (Tx) beam index for transmitting the HARQ feedback information, based on determining that the identified DL subframe is equal to a subframe corresponding to a pre-determined maximum delay time;
        determine, based on the identified Tx beam index, HARQ feedback channel resources for transmitting the HARQ feedback information; and
        control the transceiver to transmit the HARQ feedback information based on the determined HARQ feedback channel resources and the identified Tx beam index.

11. The BS of claim 10, wherein the processor is further configured to, based on determining that the identified DL subframe is not equal to the subframe corresponding to the pre-determined maximum delay time, identify the Tx beam index based on at least one of a number of available Tx beams for simultaneous transmission, a reserved resource size in a control channel resource of a subframe, a Tx beam index for at least one DL control channel resource allocated in the subframe, a Tx delay time of the HARQ feedback information, and a preset minimum delay time.

12. The BS of claim 11, wherein the processor is further configured to transmit only Negative Acknowledgement (NACK) information, excluding ACK information, in the HARQ feedback information.

13. The BS of claim 10, wherein the processor is further configured to control the transceiver to transmit, before the HARQ feedback information is transmitted in the corresponding DL subframe, a control signal including information for the identified Tx beam index in the DL subframe.

14. The BS of claim 10, wherein the HARQ feedback information is configured to be transmitted using a Tx beam of a successive DL control signal.

15. A terminal in a wireless communication system, the terminal comprising:
   a transceiver; and
   a processor configured to:
      control the transceiver to transmit an uplink (UL) data packet to a base station (BS);
      determine that a downlink (DL) subframe corresponding to hybrid automatic repeat request (HARQ) feedback information for the UL data packet does not exceed a subframe corresponding to a pre-determined maximum delay time;
      identify a transmission (Tx) beam index for receiving the HARQ feedback information;
      identify, based on the identified Tx beam index, HARQ feedback channel resources for receiving the HARQ feedback information; and
      control the transceiver to receive, from the BS, the HARQ feedback information based on the identified HARQ feedback channel resources.

16. The terminal of claim 15, wherein the processor is further configured to:
      determine that the DL subframe corresponding to the HARQ feedback information exceeds the subframe corresponding to the pre-determined maximum delay time; and
      determine that the UL data packet transmitted to the BS is successfully decoded by the BS.

17. The terminal of claim 16, wherein the processor is further configured to:
      determine that the DL subframe corresponding to the HARQ feedback information exceeds a subframe corresponding to a pre-determined minimum delay time; and
      determine whether the DL subframe corresponding to the HARQ feedback information exceeds the subframe corresponding to the pre-determined maximum delay time.

18. The terminal of claim 15, wherein the Tx beam index is identified, by the BS, based on at least one of a number of available Tx beams for simultaneous transmission, a reserved resource size in a control channel resource of a subframe, a Tx beam index for at least one DL control channel resource allocated in the subframe, a Tx delay time of the HARQ feedback information, and a pre-determined minimum delay time.

* * * * *